United States Patent [19]

Bäcklund

[11] Patent Number: 5,706,859

[45] Date of Patent: Jan. 13, 1998

[54] DIAPHRAGM VALVE

[75] Inventor: Ingvar Bäcklund, Lerduvestigen, Sweden

[73] Assignee: Robovalve AB, Sweden

[21] Appl. No.: 564,223

[22] PCT Filed: Jun. 17, 1994

[86] PCT No.: PCT/SE94/00602

§ 371 Date: Dec. 18, 1995

§ 102(e) Date: Dec. 18, 1995

[87] PCT Pub. No.: WO95/00782

PCT Pub. Date: Jan. 5, 1995

[30] Foreign Application Priority Data

Jun. 17, 1993 [SE] Sweden ................. 9302101

[51] Int. Cl.[6] .................. F16K 11/22; F16K 7/16
[52] U.S. Cl. .................. 137/885; 137/606; 251/331
[58] Field of Search ................. 137/606, 863, 137/885; 251/331

[56] References Cited

U.S. PATENT DOCUMENTS

| | | | |
|---|---|---|---|
| 2,940,474 | 6/1960 | Webster | 251/331 X |
| 2,966,928 | 1/1961 | Fairchild | 251/331 X |
| 2,976,887 | 3/1961 | Wilson | 251/331 X |
| 3,809,124 | 5/1974 | Nelson | 251/331 X |
| 3,991,788 | 11/1976 | Kull | |
| 4,182,372 | 1/1980 | Grandin et al. | 251/331 X |
| 4,696,195 | 9/1987 | Savonlahti et al. | 137/863 X |
| 4,703,913 | 11/1987 | Hunkapiller | 137/885 X |
| 5,027,857 | 7/1991 | Champseix | 251/331 X |
| 5,172,728 | 12/1992 | Tsukazaki | 251/331 X |
| 5,222,523 | 6/1993 | Trimble | 137/863 |

FOREIGN PATENT DOCUMENTS

| | | |
|---|---|---|
| 2 410 195 | 6/1979 | France. |
| 418 325 | 5/1981 | Sweden. |
| 437 869 | 3/1985 | Sweden. |

*Primary Examiner*—Gerald A. Michalsky
*Attorney, Agent, or Firm*—Pollock, Vande Sande & Priddy, R.L.L.P.

[57] ABSTRACT

A diaphragm valve for controlling a flow of gaseous or liquid fluid and including a valve housing having a valve chamber, into which opens a central channel and on each side thereof a first side channel and a second side channel, respectively, each having an external connection for fluid, valve seats arranged in the housing, an elastic diaphragm adapted to be brought into and away from sealing contact with at least one of the valve seats and controls for actuating the diaphragm. At least one portion of each valve seat is common to the central channel and one of the side channels. Two controls are arranged to press the diaphragm against one such portion each, thereby to shut off the passage of fluid between the central channel and the respective side channel, and to raise one portion each of the diaphragm off the respective portion of the valve seat thereby to open passage of flow between the central channel and the respective side channel.

7 Claims, 4 Drawing Sheets

DIAPHRAGM VALVE

FIELD OF THE INVENTION

The present invention concerns a diaphragm valve for controlling a flow of gaseous or liquid fluid and including a valve housing having a valve chamber, into which opens a central channel and on each side thereof a first side channel and a second side channel, respectively, valve seat means arranged in the housing, an elastic diaphragm adapted to be brought into and away from sealing contact with at least one of the valve seat means, and control means for actuating the diaphragm.

BACKGROUND OF THE INVENTION

In, inter alia, the process industry there is a great need for valves. In many cases, three-way valves are used for controlling flows to various equipment in a process chain. The three-way valves available today are primarily of the seat, plug cock, or ball valve type. These valves, however, have the drawback that they are provided with a stuffing box around the valve spindle transmitting motion from a control device to the valve cone, and that leakage of the fluid to be controlled can gradually occur through such a stuffing box. Further, this type of valves is provided with sealing rings behind which a fluid may settle and be difficult to remove. For many processes, therefore, these valves are not acceptable. In order to avoid these drawbacks, diaphragm valves must be used, but at present diaphragm valves suitable for the process industry are available only as two-way valves. Examples of such two-way diaphragm valves are described in SE-B-7602218-5 and 7906316-0. In order to obtain a function corresponding to, e.g., seat valves, the use of two such two-way diaphragm valves is required.

U.S. Pat. No. 3,991,788 describes a multiple outlet diaphragm valve having a constantly open inlet port, wherefrom a flow is led to a normally open outlet port. Upon selection of another outlet port, the normally open port is first closed, whereafter the selected port is opened. This diaphragm valve is complicated in its operation and has many movable parts. It is unsuitable for the process industry because it is difficult to clean, and it can hardly be made self-draining.

SUMMARY OF THE INVENTION

The object of the present invention is to provide a three-way diaphragm valve for the process industry, which permits the mixing of two flows, or the division of one flow to two different outlets. In achieving this object, the diaphragm valve must also comply with extensive sanitary requirements, be simply and reliably operable and have relatively few movable parts. Further, the valve must easily be made self-draining.

BRIEF DESCRIPTION OF THE DRAWINGS

The present invention will now be described in more detail, reference being made to the accompanying drawings, wherein.

DETAILED DESCRIPTION

Figure 3:
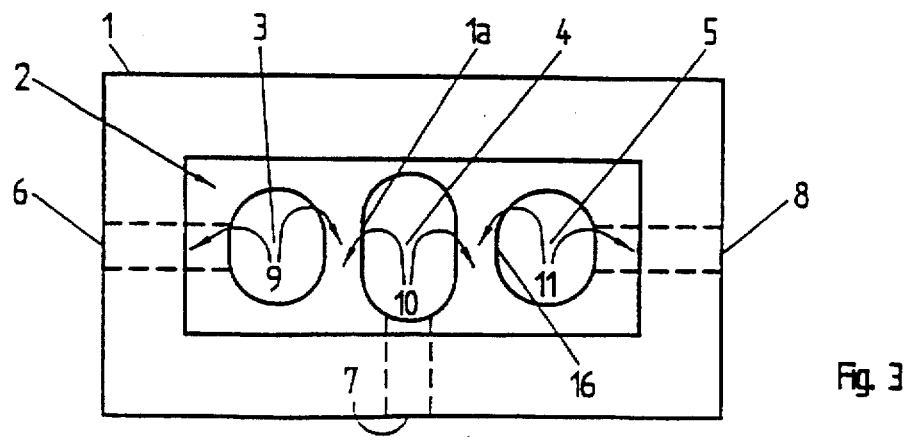
FIG. 3 is section along line III—III in FIG. 1.

The diaphragm valve according to the present invention comprises a valve housing 1 having a valve chamber 2, in this embodiment having an approximately rectangular shape seen in plan view (FIG. 3). Into the valve chamber open, sequentially in the longitudinal direction of the rectangular shape, a first side channel 3, a central channel 4 and a second side channel 5, each having an outer fluid connection or port 6, 7 and 8, respectively. The channels 3 and 5 are substantially symmetrically arranged with respect to the central channel 4. The mouths of the channels 3 and 4, and 4 and 5, respectively, are separated by valve housing walls 1a and 1b, respectively, that are symmetrically located with respect to the central channel 4. Portions of the surface of the valve housing around the mouths of the channels form valve seats 9, 10 and 11, respectively.

A resilient diaphragm 12 is arranged on the valve housing 1 and adapted to be brought into and away from sealing contact with at least one of the valve seats.

In order to control the movements of the diaphragm 12, the valve is provided with an operating unit 13, in turn comprising a control part 14 and a drive part 15.

The control part 14 includes a rectangular housing 16, in which are guided two pressure and lifting blocks 17 and 18, which are adapted to press, freely bearing on the diaphragm, one portion each of the diaphragm 12 against the valve housing and its seatings and to lift corresponding portions off the valve housing. For the latter purpose, the diaphragm 12 is provided with two separated tongues 12a, 12b, located symmetrically about a vertical plane of symmetry including the center line of the diaphragm and the axis of the central channel 4. The tongues 12a, 12b are situated closer to the vertical plane of symmetry than are the valve housing walls 1a and 1b. Pins 19, 20 introduced into the blocks 17 and 18, respectively, extend through the tongues. In the blocks 17 and 18 are attached the lower ends of pull and push rods 21 and 22, respectively, that are sealingly guided in a wall 23 sealingly separating the control part 14 and drive part 15.

The drive part 15 includes a housing 24 having two parallel cylinders 25 and 26, which are axially defined by the wall 23 and an upper wall 27 opposed thereto. Pistons 28 and 29 are guided in the cylinders 25 and 26 and are fixedly connected to the upper ends of the rods 21 and 22, respectively. Between the upper wall 27 and the respective piston 28, 29 is arranged a compression spring 30 and 31, respectively, which, thus, presses the associated piston, rod 21, 22 and block 17, 18 downwards towards the diaphragm. The housing 24 comprises connections 32, 33 to introduce pressure medium via solenoid valves 34, 35 into the cylinders 25, 26 under the respective piston 28, 29, thereby to raise these against the force of the respective spring.

By actuating the solenoid valves 34, 35, raising of either of blocks 17, 18, or, simultaneous raising of both blocks can be achieved.

The surface of the respective block 17 and 18 facing the diaphragm 12 has a shape and extension such that each block sealingly presses the diaphragm against only one of seats 9 and 11, respectively, while simultaneous pressing of both blocks against the diaphragm sealingly presses the diaphragm against all of valve seats 9, 10, 11.

The arrangement of the tongues 12a, 12b of the diaphragm, the valve housing walls 1a and 1b, and the blocks 17 and 18 is such that raising of one block while the other is still pressed against the diaphragm causes the corresponding portion of the diaphragm to leave its sealing contact with the associated seat 9 or 11. Since each of these seats has one seat surface in common with the seat 10 of the central channel 4, not only one of the channels 3 and 5 will be opened towards the valve chamber, but also the central channel 4. In this manner, communication is established between the channels 3 and 4, and 5 and 4, respectively.

It will be understood that simultaneous raising of both blocks 17 and 18 will establish communication between all three channels 3, 4 and 5.

Figure 1:
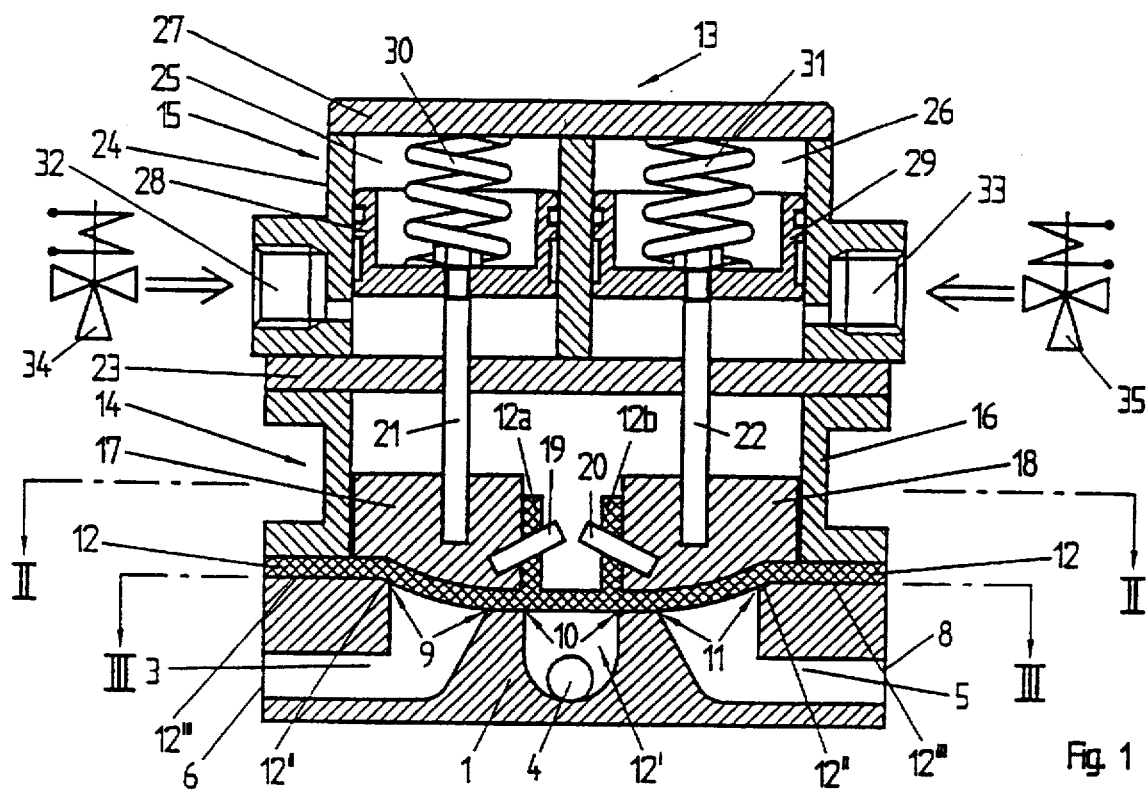
FIG. 1 is a vertical central section through a first embodiment of the invention.
Figure 2:
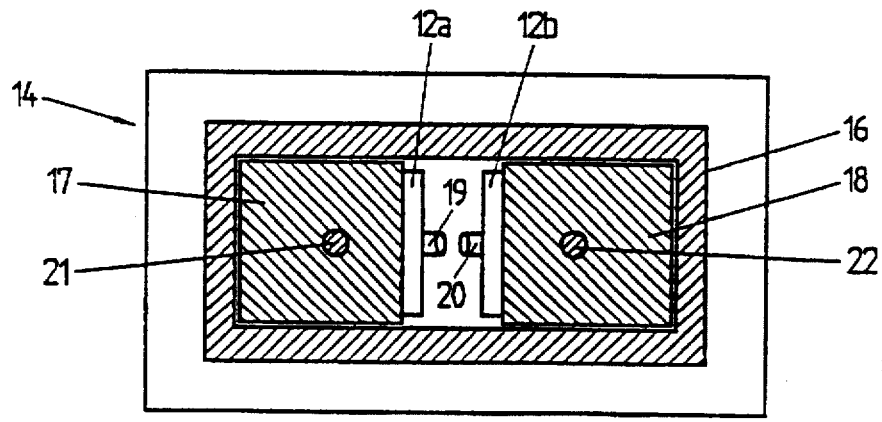
FIG. 2 is a section along line II—II in FIG. 1.

As shown in FIG. 1, the seat surfaces common to channel 4 and channels 3 and 5 are horizontal, while the seat surfaces of the channels 3 and 5 turned away from each other are inclined, such that the valve chamber exhibits a concave shape.

Advantageously, the diaphragm is pre-shaped so that its underside, in the unactuated state of the diaphragm, has a substantially corresponding concave shape. This state applies when both blocks 17 and 18 are raised and thus there is communication between all channels. When both blocks are pressed by the springs 30 and 31 against the seats of the valve housing, the diaphragm is deformed into the shape shown in FIG. 1. In this state, the upper side of the diaphragm, having a substantially uniform thickness, obtains a concavity corresponding to the concavity of the valve chamber, the lower surfaces of the two blocks being in turn adapted thereto in order to exert an evenly distributed pressure against the diaphragm.

Expressed in another manner, it could be said that the diaphragm has a plate or tray-like shape having a flat portion 12' adapted to cover the channel 4, i.e., to bear on the seat 10, and two inclined portions 12" adapted to cover the channels 3 and 5, i.e., to bear on the seats 9 and 11 and particularly the outer portions thereof. Furthermore, the diaphragm has a plane peripheral portion 12''' clamped between the valve housing 1 and the housing 16.

Figure 4:
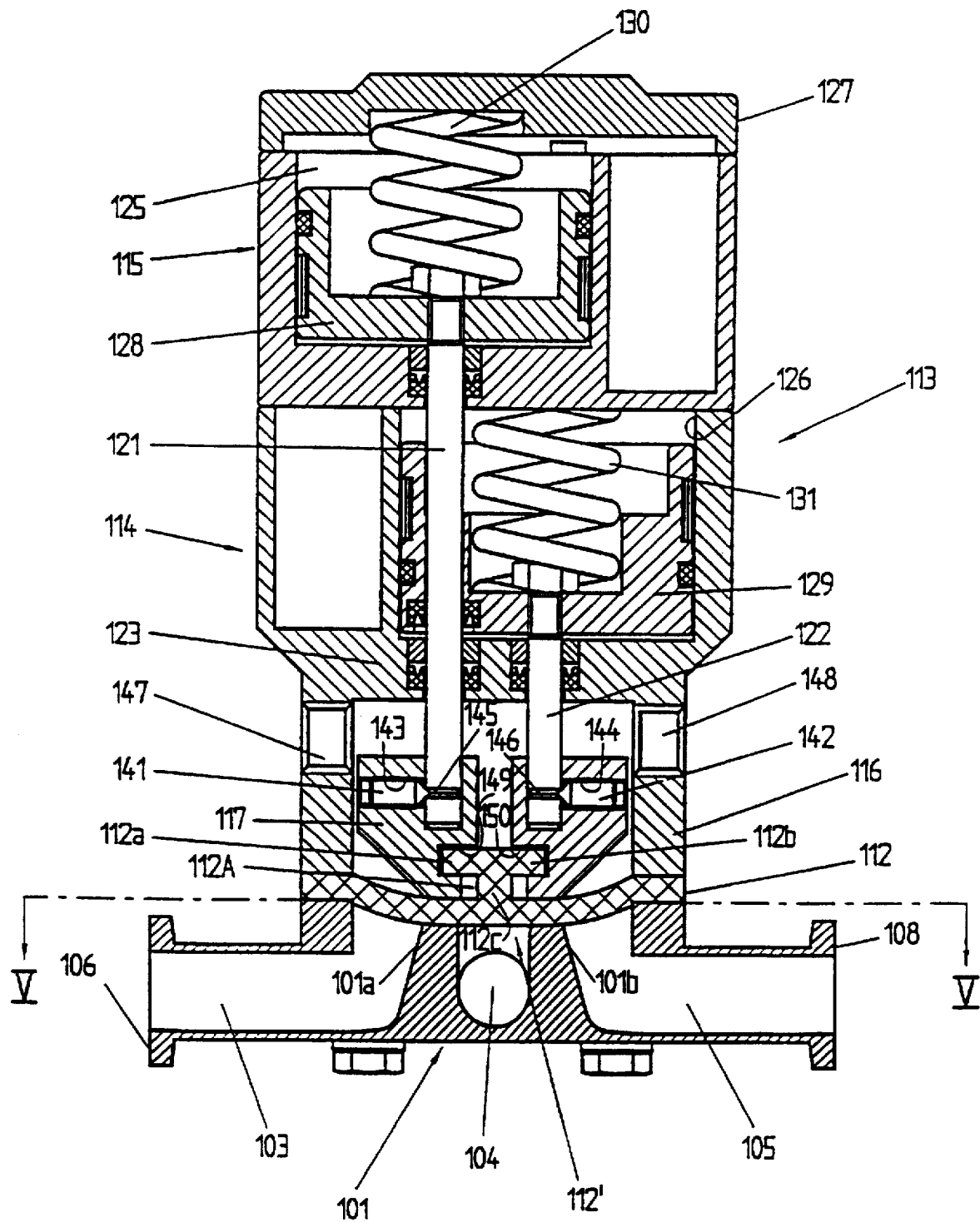
FIG. 4 is a vertical central section through a second embodiment of the invention.
Figure 5:
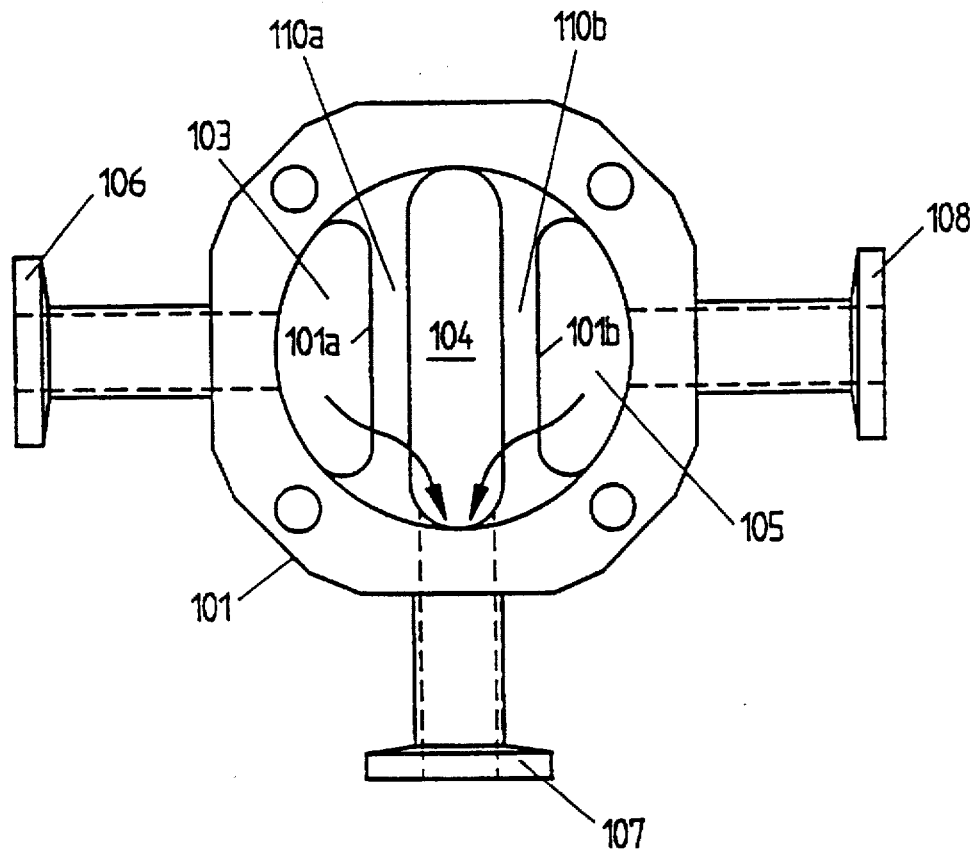
FIG. 5 is a section along line V—V in FIG. 4.
Figure 6:
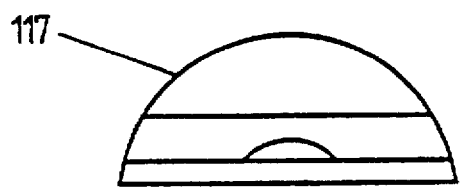
FIG. 6 is a bottom view of a pressure and lifting block of the second embodiment.
Figure 7:
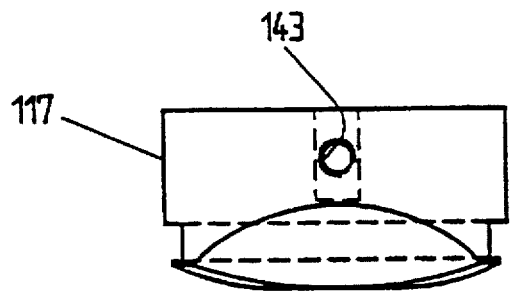
FIG. 7 is a side view of the pressure and lifting block of FIG. 6.

FIGS. 4, 5, 6 and 7 show a second embodiment of the invention, differing from the first embodiment primarily in that the valve chamber 102 of the valve housing 101 and the effective portion of the diaphragm 112 are substantially circular. In this embodiment, the diaphragm 112 also has a plane portion 112A. The tongues 12a, 12b are replaced by a single lifting yoke of substantially T-shaped cross section, with lifting flanges 112a and 112b and a web portion 112c. The lifting yoke is centrally located on the diaphragm 112. This arrangement enables a very compact structure of the complete valve, in that the associated lift and pressure blocks 117, 118 can be arranged close to each other. As a result, the rods 121, 122 will be located so close to each other that cylinders and pistons situated laterally to each other cannot suitably be used, since pneumatic system pressure normally available within the process industry is at 6 bar and would result in a force too low to overcome the necessary spring force. Therefore, the cylinders are axially displaced such that, as seen in the axial direction, they overlap each other. One piston thus receives a longer piston rod than the other. The arrangement can be such that the longer piston rod extends radially outside the other cylinder (not shown), or, as shown in FIG. 4, that the longer piston rod 121 extends through the other cylinder and its associated piston 129.

In this embodiment, the operating unit 113 is divided into a combined control-and-drive part 114 and a drive part 115. The control-and-drive part 114 accommodates, within a cylindrical lower wall portion 116, the blocks 117 and 118, and above a partition wall 123 the cylinder 126, which is sealed at its top by the bottom 115a of the drive part 115, which accommodates the cylinder 125. The bottom 115a as well as the partition wall 123 contain seals for the rod 121 and the rods 121 and 122, respectively. The piston 129 also contains a seal for the rod 121.

Additional connections (not shown) for supply to the cylinders of pressurized fluid for controlling the valve may be provided.

In this embodiment, the rods 121 and 122 are coupled to the blocks 117, 118 by means of threaded conical pins 141, 142 screwed into threaded holes 143, 144 in the blocks and having tips engaging notches 145, 146 in the rods. Mounting of the pins 141, 142 takes place through openings 147 provided for this purpose in the wall portion 116, while springs 130, 131 are compressed.

The blocks 117, 118 have recesses 149, 150 into which the lifting flanges 112a, 112b are introduced. As appears from FIG. 4, there is a space between the web portion 112c of the lifting yoke and the lower ends of the blocks. This space allows lateral movement (inclination) of the web portion due to the elastic deformation thereof and of adjacent portions of the lifting flanges arising from raising one block while the other is kept in contact with the diaphragm.

In contrast to the first embodiment, the valve housing of the second embodiment does not have a pronounced valve seat for each channel, but rather two part seats 110a and 110b (FIG. 5), against which the plane portion 112' of the diaphragm bears and which are formed by the upper surfaces of the valve housing walls 101a and 101b. These part seats, however, serve all channels by extending like chords across the valve chamber 102 right up to the peripheral portion of the diaphragm 112, which is clamped between the valve housing 101 and the cylindrical wall 116 of the control and drive part 114. Thus, the part seat 110a serves the channel 103 and, together with the part seat 110b, the channel 104. For this reason, is sufficient that the blocks 117, 118 press against the diaphragm only over the part seats 110a and 110b. Consequently, the blocks 117 and 118 have been given the wedge shape shown in FIG. 4 bearing on the diaphragm only over the respective part seat. It is important, however, that the blocks press against the diaphragm over its entire effective sealing area. Therefore, the contact surface of the blocks has been given the curved shape adapted to the valve seats that appears in FIG. 7.

In this embodiment, the diaphragm is also raised centrally in relation to the valve housing walls 101a and 102a and their part seats 110a, 110b.

In both embodiments of the invention described and shown, when opening a flow passage between the central channel and a side channel, the diaphragm undergoes a deformation involving bending or twisting about the edge of the downward-pressing block facing the opening side while raising the opening half of the diaphragm.

Figure 8:
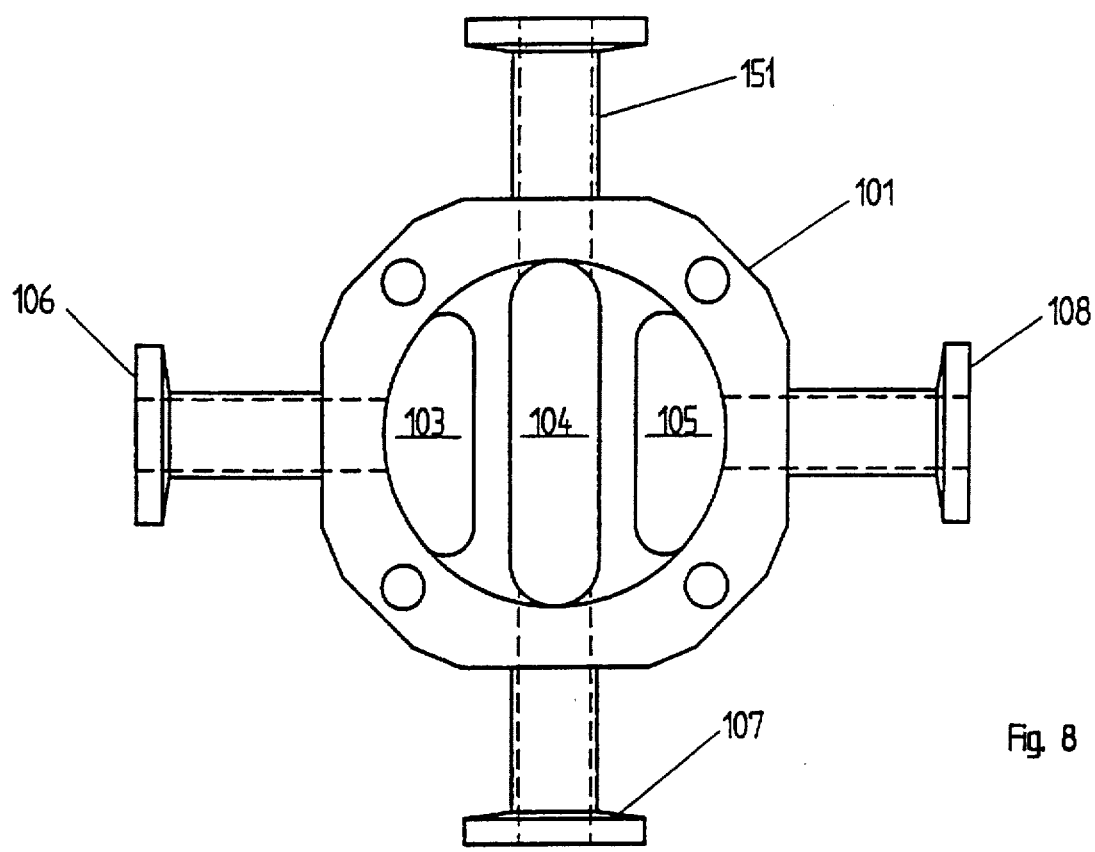
FIG. 8 shows an alternative form of a valve housing.

Normally, the central channel 4 (104) is the channel through which a medium is introduced into the valve to be selectively distributed to either or both of side channels 3 (103) and 4 (104). In certain applications it may be advantageous to have a fourth connection to, or port in the valve chamber, viz., in the shape of a continuation of the channel 4 (104). Such a connection 151 is shown in FIG. 8. Several valves arranged in this manner and having their central channels 4 (104) interconnected can provide favorable solutions to valve problems, e.g., upon fractioning.

Figure 9:
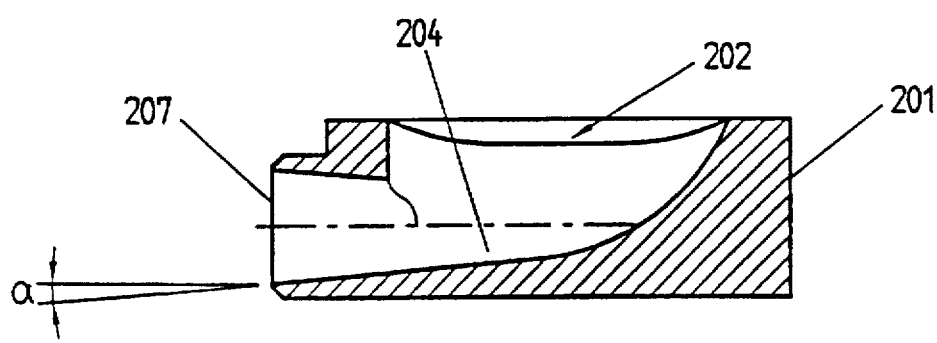
FIG. 9 is a section through a valve housing along the central channel.
Figure 10:
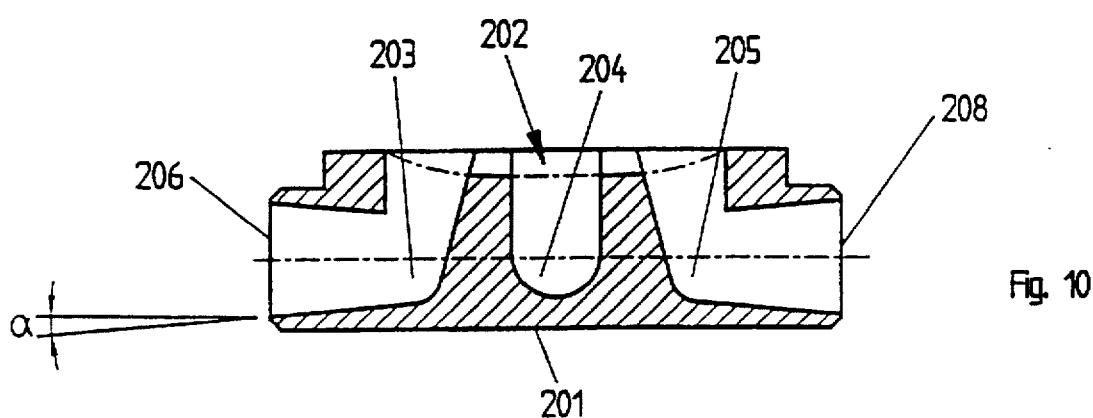
FIG. 10 is a section through the two side channels perpendicular to the section according to FIG. 9.

Certain process industries require valves to be self-draining. The present invention meets this requirement in that, as shown in FIGS. 9 and 10, the bottoms of the channels 203, 204, 205 in the valve housing 201 are outwardly inclined at an angle α towards the respective connection 206, 207, 208. A suitable inclination is 5°. The bowl shape of the valve chamber is also shown in FIGS. 9 and 10.

Furthermore, the mouths of the channels 103 and 105 in the valve chamber 102, and particularly the valve housing walls 101a and 101b, may advantageously be shaped so that, when the diaphragm is open, self-drainage of the channels 103 and 105 is effected over the valve housing walls 101a and 101b (see arrows in FIG. 5) at a certain inclination of the valve housing about the common axis of the channels 103 and 105.

The invention hereinbefore described provides a three-way diaphragm valve, which, for instance within the process industry, replaces the previously required two two-way diaphragm valves. Further, the inventive diaphragm valve complies with the recommendations of authorities as well as the demands of manufacturers and customers to eliminate stuffing boxes and sealing rings behind which stationary fluids may collect, and hence meets the demands for safe and easy cleaning of the device. The device also meets the demands for minimal enclosed flow volume within the valve. Thus, during cleaning and flushing of the valve, all flow channels may be uncovered by simultaneous actuation of the control cylinders.

As an alternative to the operation by pneumatic or hydraulic cylinders shown and described, the control means may be electrically or manually operated.

The terms "raise" and "raising" used in the preceding description and in the claims, as concerns the influence of the blocks on the diaphragm, should, apart from positive raising, be interpreted to include the meaning "allow raising", viz., that the downward pressing action is withdrawn and that "raising" of the diaphragm occurs in consequence of pressure prevailing in the respective channel and/or due to pre-tension inherent in the diaphragm.

I claim:

1. A diaphragm valve for controlling a flow of gaseous or liquid fluid and including a valve housing having a substantially circular valve chamber, into which opens a central channel, and on each side thereof a first side channel and a second side channel, respectively, each of said channels having an external connection for fluid, said side channels each being separated from said central channel by a respective one of two substantially parallel valve seat means extending like chords across said valve chamber and each providing a substantially linear valve seat for an elastic diaphragm adapted to be brought into and away from sealing contact with at least one of said valve seat means, and two individually operable control means adapted both to press a respective linear portion of said diaphragm against a respective valve set means, thereby to shut passage of fluid between said central channel and a respective side channel, and to positively raise a respective portion of said diaphragm off a respective one of said valve seat means, thereby to open a flow passage between said central channel and said respective side channel.

2. A diaphragm valve according to claim 1 wherein said diaphragm is provided with two separate coupling means integral with said diaphragm and each adapted for cooperation with one of said control means.

3. A diaphragm valve according to claim 1 wherein said control means are connected by way of piston rods to one piston each guided in an associated cylinder.

4. A diaphragm valve according to claim 3, wherein the piston rod of one piston extends through the other piston and its associated cylinder.

5. A diaphragm valve according to claim 1, wherein said central channel extends through said valve housing between two external connections.

6. A diaphragm valve according to claim 1, wherein said valve chamber is self-draining, in that bottoms of said channels slope towards a respective external connection when said valve housing is horizontal.

7. A diaphragm valve according to claim 1, wherein said two side channels are self-draining through said central channel when said valve housing is inclined at a predetermined angle in relation to a horizontal plane through a common axis of said two side channels.

* * * * *